United States Patent
Büttner et al.

(10) Patent No.: US 9,876,411 B2
(45) Date of Patent: Jan. 23, 2018

(54) COOLING JACKET COMPRISING A SEALING MEANS

(71) Applicant: SIEMENS AKTIENGESELLSCHAFT, München (DE)

(72) Inventors: Klaus Büttner, Hollstadt (DE); Stephan Hellmuth, Bad Neustadt (DE); Klaus Kirchner, Ostheim (DE); Matthias Warmuth, Windshausen (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 173 days.

(21) Appl. No.: 14/416,826

(22) PCT Filed: Jun. 20, 2013

(86) PCT No.: PCT/EP2013/062878
§ 371 (c)(1),
(2) Date: Jan. 23, 2015

(87) PCT Pub. No.: WO2014/016063
PCT Pub. Date: Jan. 30, 2014

(65) Prior Publication Data
US 2015/0207378 A1 Jul. 23, 2015

(30) Foreign Application Priority Data
Jul. 25, 2012 (DE) .................. 10 2012 213 070

(51) Int. Cl.
*H02K 5/20* (2006.01)
*H02K 9/12* (2006.01)
(Continued)

(52) U.S. Cl.
CPC ............. *H02K 5/20* (2013.01); *B23P 15/26* (2013.01); *F28D 15/00* (2013.01); *H02K 9/12* (2013.01);
(Continued)

(58) Field of Classification Search
CPC .. H02K 5/20; H02K 5/12; H02K 1/20; H02K 1/32; H02K 9/00; H02K 9/005;
(Continued)

(56) References Cited

U.S. PATENT DOCUMENTS 4,173,822 A 11/1979 Fritschy
8,836,193 B2 9/2014 Büttner et al.
(Continued)

FOREIGN PATENT DOCUMENTS

CN 201341052 Y 11/2009
DE 3736159 A1 9/1993
(Continued)

OTHER PUBLICATIONS

Zisler Michael; Then Thomas, Electric Machine Comprising a Housing for Liquid Cooling, Oct. 12, 2006, WIPO, WO 2006106086.*

*Primary Examiner* — Bernard Rojas
*Assistant Examiner* — Alexander Singh
(74) *Attorney, Agent, or Firm* — Henry M. Feiereisen LLC

(57) ABSTRACT

A cooling jacket includes a jacket having an axial end provided with an opening, and a sealing structure which is arranged in the opening. A member selected from the group consisting of the jacket and the sealing structure has a radial deformation to connect the jacket to the sealing structure. The radial deformation is configured to extend into the opening.

10 Claims, 6 Drawing Sheets

(51) Int. Cl.
  *H02K 9/14*    (2006.01)
  *H02K 9/197*   (2006.01)
  *H02K 9/19*    (2006.01)
  *H02K 9/16*    (2006.01)
  *B23P 15/26*   (2006.01)
  *F28D 15/00*   (2006.01)

(52) U.S. Cl.
  CPC ............... *H02K 9/14* (2013.01); *H02K 9/16* (2013.01); *H02K 9/197* (2013.01); *H02K 9/19* (2013.01); *Y10T 29/49359* (2015.01)

(58) Field of Classification Search
  CPC .. H02K 9/08; H02K 9/10; H02K 9/12; H02K 9/14; H02K 9/16; H02K 9/18; H02K 9/19; H02K 9/193; H02K 9/197; H02K 9/20; H02K 9/24; F28D 15/00; B23P 15/26; Y10T 29/49359
  USPC ........ 310/52, 53, 54, 57, 58, 12.29, 216.119
  See application file for complete search history.

(56) References Cited

U.S. PATENT DOCUMENTS

| | | |
|---|---|---|
| 2003/0193249 A1 | 10/2003 | Drubel et al. |
| 2007/0096588 A1 | 5/2007 | Kirchner |
| 2008/0284263 A1 | 11/2008 | Telma |
| 2012/0133236 A1 | 5/2012 | Büttner et al. |
| 2012/0169158 A1 | 7/2012 | Büttner et al. |
| 2012/0170016 A1* | 7/2012 | Zordan ............ H02K 9/19 355/72 |
| 2012/0187796 A1 | 7/2012 | Büttner et al. |
| 2012/0205996 A1 | 8/2012 | Büttner et al. |
| 2013/0076166 A1* | 3/2013 | Chamberlin ........ H02K 5/20 310/54 |
| 2013/0175892 A1 | 7/2013 | Büttner et al. |
| 2013/0187512 A1 | 7/2013 | Büttner et al. |
| 2013/0234543 A1 | 9/2013 | Büttner et al. |
| 2013/0257197 A1 | 10/2013 | Büttner et al. |

FOREIGN PATENT DOCUMENTS

| | | | |
|---|---|---|---|
| DE | 69004513 T2 | 5/1994 | |
| DE | 69408559 T2 | 9/1998 | |
| DE | 19950660 B4 | 2/2004 | |
| DE | 102004050645 A1 | 5/2006 | |
| DE | 102006044785 A1 | 4/2008 | |
| DE | 102009031727 A1 | 2/2010 | |
| EP | 0822641 A2 | 2/1998 | |
| JP | 42 72 906 B2 | 6/2009 | |
| RU | 20 27 281 C1 | 1/1995 | |
| RU | 23 47 308 C2 | 2/2009 | |
| SU | 554 595 A1 | 4/1977 | |
| WO | WO 2006106086 A1 * | 10/2006 | ............ H02K 5/20 |
| WO | WO 2012079623 A1 | 6/2012 | |

* cited by examiner

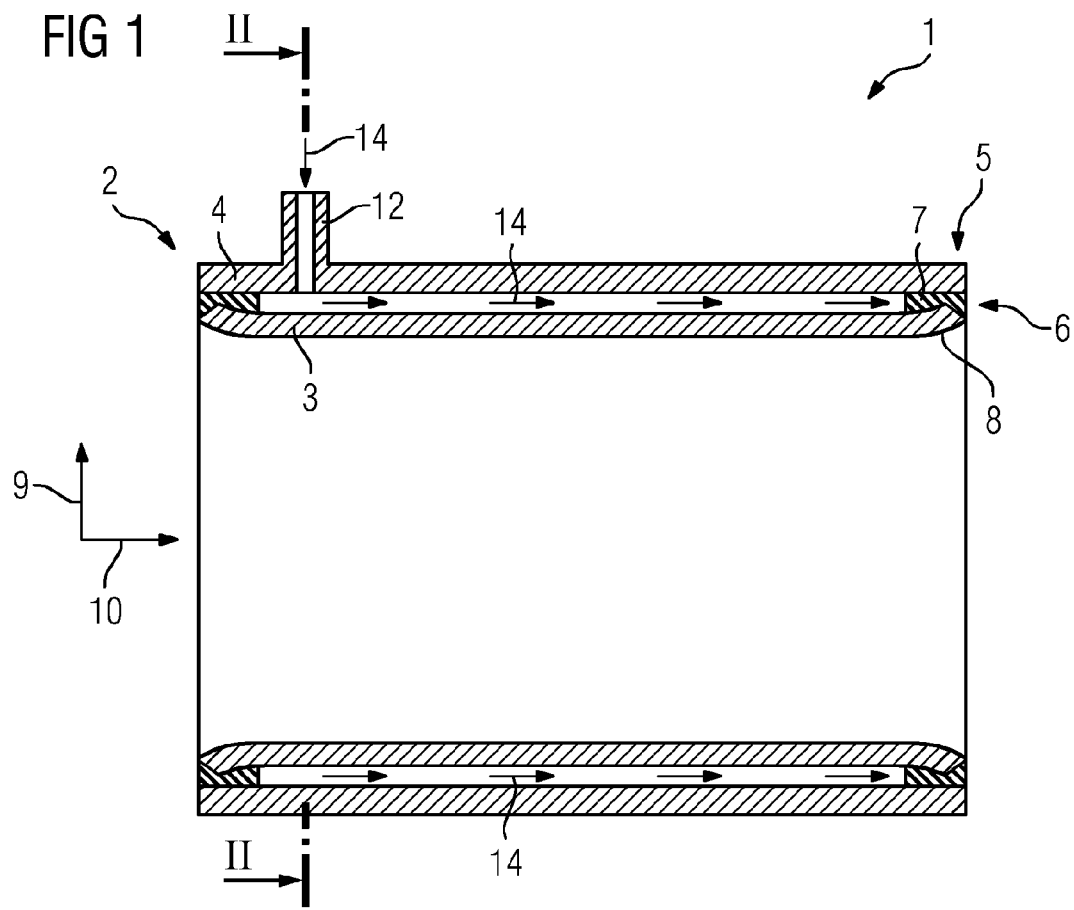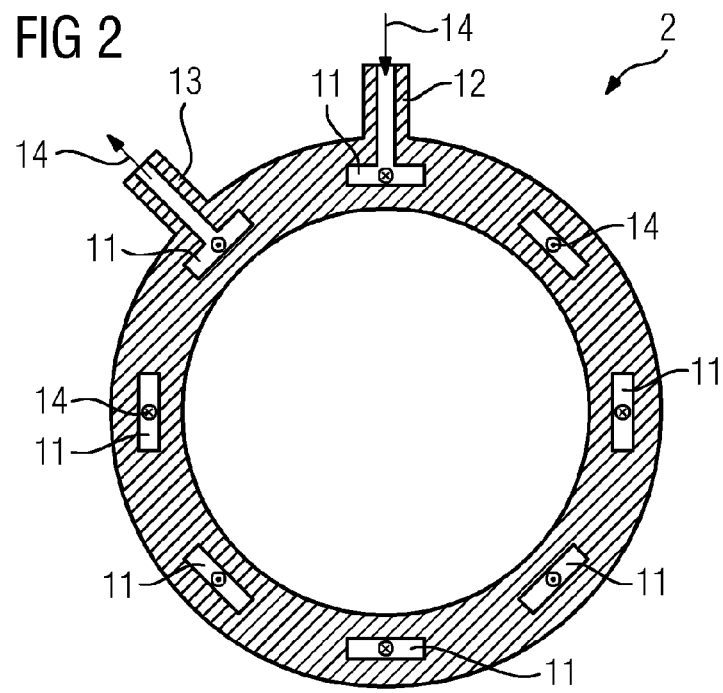

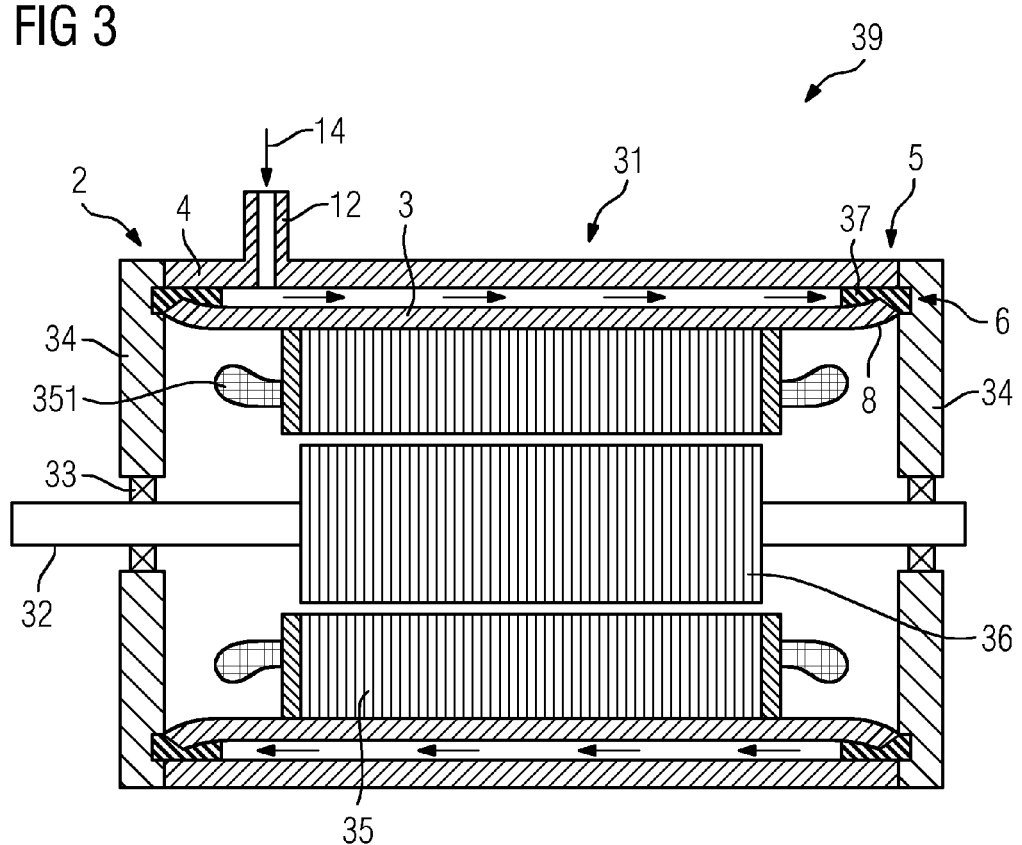

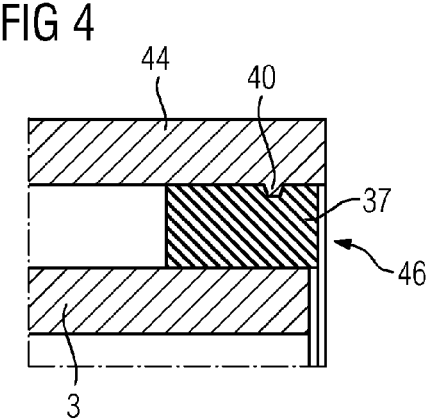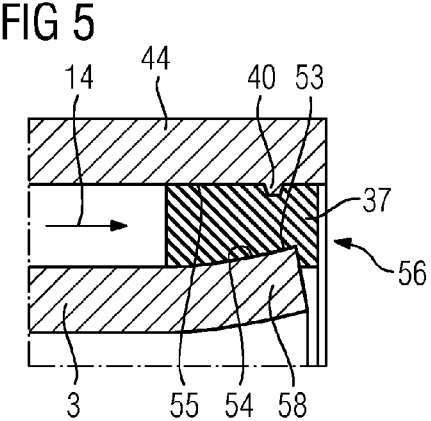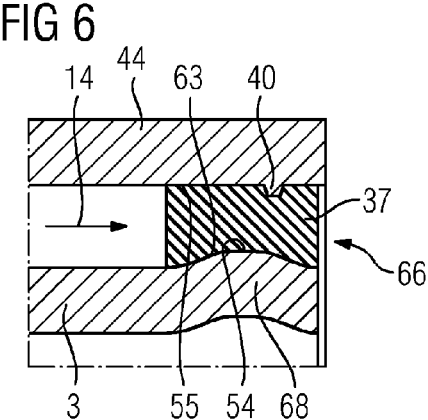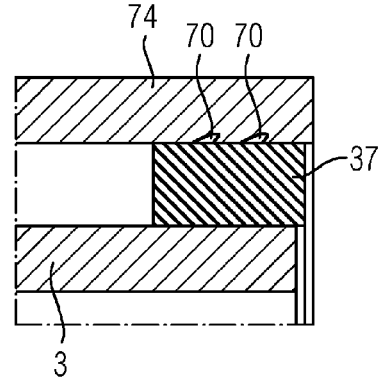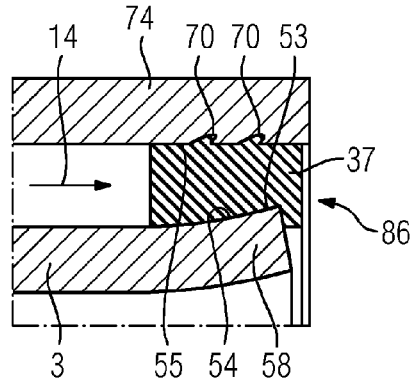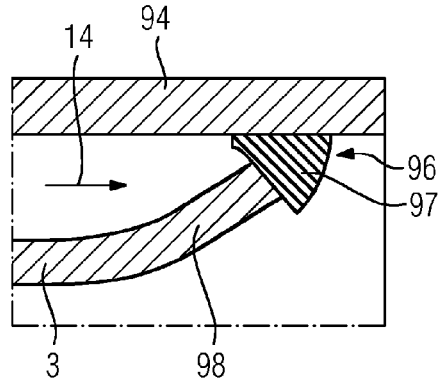

COOLING JACKET COMPRISING A SEALING MEANS

CROSS-REFERENCES TO RELATED APPLICATIONS

This application is the U.S. National Stage of International Application No. PCT/EP2013/062878, filed on Jun. 20, 2013, which designated the United States and has been published as International Publication No. WO 2014/016063 and which claims the priority of German Patent Application, Serial No. 10 2012 213 070.5, filed on Jul. 25, 2012, pursuant to 35 U.S.C. 119(a)-(d).

BACKGROUND OF THE INVENTION

The invention relates to a cooling jacket comprising a sealing means, a jacket for a cooling jacket, a sealing means for a cooling jacket, a machine, in particular an electric machine, comprising a cooling jacket, a method for producing a cooling jacket and a method for producing a machine, in particular an electric machine, in which the tightness of a cooling jacket is tested.

Cooling jackets are used for cooling machines in order to improve their performance. The cooling jacket surrounds the part of the machine that heats up during the operation of the machine. The heat is removed from the machine part by a fluid flowing in the cooling jacket. A fluid can be gaseous or liquid.

A cooling jacket is known from DE 10 2004 050 645 A1 that is formed from cooling channels extending in a housing wall. An opening of the cooling channels is sealed by an inner sealing ring, which is connected to the housing wall with a form fit. The inner sealing ring has annular recesses for forming a deflection channel for the fluid flowing through the cooling jacket.

WO 2006/106086 A1 describes a central housing section of a housing of an electric machine comprising cooling channels, which are sealed by O-rings.

With the known cooling jackets, the sealing that is necessary during the operation of the electric machine only takes effect after the installation of the end shields.

SUMMARY OF THE INVENTION

The invention is therefore based on the object of reducing unintentional leakage of the fluid flowing in the cooling jacket from the cooling jacket in different operational situations.

According to one aspect of the invention, the object is achieved by a cooling jacket for cooling by a fluid flowing in the cooling jacket, which has
 a jacket that has an inner jacket and an outer jacket, wherein the jacket has an opening at an axial end,
 a sealing means arranged in the opening and
 a radial deformation connecting the jacket to the sealing means, wherein the radial deformation extends into the opening.

According to another aspect of the invention, the object is also achieved by a jacket for a cooling jacket as set forth above, with the jacket connectable to the sealing means by the radial deformation.

The object is also achieved by a sealing means according to the invention for a cooling jacket.

The sealing means according to the invention for a cooling jacket according to the invention can be connected to the jacket by the radial deformation.

According to another aspect of the invention, the object is also achieved by a machine, in particular an electric machine, including a cooling jacket as set forth above.

A machine according to the invention, in particular an electric machine according to the invention, comprises a cooling jacket according to the invention.

The object is also achieved by a method for producing a cooling jacket.

With the method according to the invention for producing a cooling jacket according to the invention, a connection is created between the jacket and the sealing means.

According to another aspect of the invention, the object is also achieved by a method for producing a machine, in particular an electric machine, wherein the tightness of the cooling jacket as set forth above is tested before mounting an end shield on the cooling jacket.

With the method according to the invention for producing a machine according to the invention, in particular an electric machine according to the invention, the tightness of the cooling jacket according to the invention is checked before mounting an end shield on the cooling jacket.

The cooling jacket according to the invention achieves the object in that the radial deformation that extends into the opening connects the jacket to the sealing means. Advantageously, the opening is sealed such that leakage of the fluid flowing in the cooling jacket from the opening is reduced. In particular, a lower amount of fluid leaks out of the cooling jacket when said jacket is operating on a first filling with a fluid. During operation of the cooling jacket, the fluid flows at a pressure through the cooling jacket. The pressure differs in different operational situations. The radial deformation reduces leakage of the fluid flowing in the cooling jackets in that it is able to withstand higher pressures and extreme pressure fluctuations.

With the cooling jacket, the opening can be arranged between the inner jacket and the outer jacket. Thus, it is easy to create the opening. In particular, the opening can be an axial opening. Here, the axial opening extends in an axial direction. This means the radial deformation is simple to establish.

A cooling jacket can have the shape of a hollow cylinder. The inner surface of the hollow cylinder is formed by the inner jacket and the outer surface of the hollow cylinder is formed by the outer jacket. An axial direction of the cooling jacket is then defined by the axis of rotation of the hollow cylinder. A cooling jacket with the shape of a hollow cylinder is simple to produce.

A cooling jacket can also have a shape different from a hollow cylinder. For example, the cooling jacket can have flat surfaces in sections. These flat surfaces enable the cooling jacket to be mounted on one plane.

An axial direction of the cooling jacket is generally defined by a straight line that extends substantially parallel to the jacket of the cooling jacket. A radial direction is a direction extending perpendicular to the axial direction.

The fluid flowing in the cooling jacket can substantially flow between the inner jacket and the outer jacket in one or more channels. At least one a channel can have the opening. To simplify the production of the jacket, a channel can have openings at different axial ends of the jacket.

The cooling jacket can comprise a first connection through which the fluid can flow into a channel of the cooling jacket and a second connection through which the fluid can leave the cooling jacket. This means the cooling jacket can be operated before installation in a machine.

Advantageously, the fluid flowing in the cooling jacket is a liquid. A liquid enables the cooling jacket to achieve better cooling efficiency. The cooling efficiency is the amount of heat the cooling jacket is able to remove by means of the fluid.

Apart from the aforementioned advantages, a jacket according to the invention for a cooling jacket also has the further advantage that, before the creation of the connection between the jacket and the sealing means, the jacket needs no radial deformation or only a slight radial deformation. Thus, different degrees of a radial deformation enable a prefabricated jacket to interact with different sealing means and thus enable different variants of cooling jackets.

Apart from the aforementioned advantages, a sealing means according to the invention also has the further advantage that the sealing means can comprise a material which offers less resistance to the fluid than would be necessary to seal the opening of the jacket if the cooling jacket did not have the radial deformation.

Apart from the aforementioned advantages, a machine according to the invention, in particular an electric machine according to the invention, also has the further advantage that components of the machine are better protected against the fluid flowing in the cooling jacket. This is enabled due to the fact that the cooling jacket is an independent component of the machine, in particular the electric machine, and thus, during the production of the machine, in particular the electric machine, as a result of the assembly of components of the machine, in particular the electric machine, there is a lower probability of leaks occurring. This means that, during the production of the machine, in particular the electric machine, a lower number of machines, in particular electric machines, have to be reworked. Reworking of the machine, in particular the electric machine, requires time-consuming dismantling of the machine, in particular the electric machine, and the replacement of the defective components. In particular, dismantling of the machine, in particular the electric machine, is time-consuming if a component inside a housing of the machine, in particular the electric machine, can only be replaced by dismantling a part mounted on a component of the machine, in particular the electric machine. A component of the machine, in particular the electric machine, can be a shaft mounted rotatably in the part.

It is also advantageous with a machine according to the invention that a housing of the electric machine can be opened for repair work without it being necessary to open an opening of the cooling jacket, in particular the channels for the flowing fluid. Thus, components of the machine can be replaced without there being any risk of the components coming into contact with the fluid and thus being damaged.

An electric machine according to the invention comprising the cooling jacket according to the invention is particularly advantageous since components of an electric machine are very sensitive to fluids. Fluids usually comprise electrically conductive materials or contain such materials as contaminants. If an electrically conductive connection is established or an electrical breakdown due to a fluid occurs on a component of the electric machine, in particular a winding, an increased current flow or an increased voltage can not only destroy the winding or the entire electric machine but also endanger people in the vicinity of the electric machine.

Apart from the aforementioned advantages, a method according to the invention for producing a cooling jacket according to the invention also has the further advantage that, on the creation of the connection between the cooling jacket and the sealing means, no further components are arranged in or on cooling jacket so that the connection can be created without taking account of sensitive or obstructive components. This enables the optimal creation of the connection in order to reduced unintentional leakage of the fluid from the cooling jacket in different operational situations.

Apart from the aforementioned advantages, a method according to the invention for producing a machine according to the invention, in particular an electric machine according to the invention, also has the further advantage that the cooling jacket alone is easy to transport and is easy to move into different positions. Thus, the tightness of the cooling jacket can be advantageously tested in numerous different conditions, for example different positions of the cooling jacket.

Advantageous embodiments of the invention are disclosed in the dependent claims.

Thus, it is advantageous in one embodiment of a cooling jacket according to the invention, for a solid part to have a radial deformation. The fluid flowing in the cooling jacket is prevented from exiting from the opening of the jacket by the radial deformation, the sealing means and the jacket. The fluid creates a pressure on the radial deformation, the sealing means and the jacket. Due to the fact that the solid part has the radial deformation, a force causing the pressure is to a large extent absorbed by the solid part. Thus, advantageously, the radial deformation on the solid part can reduce leakage of the fluid flowing in the cooling jackets at high pressure. In addition, the radial deformation of the solid part causes the sealing means to be held in position even on pressure changes or on a first filling of the cooling jacket with the fluid so that leakage of the fluid is prevented.

The radial deformation can be plastic. This enables a radial deformation in a specific shape to be established on the cooling jacket, which after the establishment of the radial deformation retains the specific shape in numerous different operational situations. Thus, unintentional leakage of the fluid flowing in the cooling jackets from the cooling jacket is reduced in different operational situations.

In a further advantageous embodiment of a cooling jacket according to the invention, the jacket has the radial deformation. It is possible to establish a radial deformation on the jacket in a simple way by means of a tool before or after arrangement of the sealing means in the opening. Thus, the jacket advantageously offers a radial deformation on a solid part.

In this case, the tool for creating the radial deformation of the jacket can advantageously extend over a cross section of the cooling jacket in the radial direction so that pressing the tool into the jacket causes radial deformations to be created at all openings to channels at the axial end of the cooling jacket in which the fluid is able to flow.

The sealing means can have a welded seam. The welded seam enables the opening of the jacket to be closed with high mechanical stability. The radial deformation of the jacket means the opening is so narrow that an individual welded seam is sufficient to close the opening of the jacket. A single welded seam has particularly high mechanical stability.

In particular, in one operational step, a continuous single welded seam can be created on the cooling jacket to close all the openings of the jacket to the channels of the cooling jacket.

The sealing means can also have a seal. The seal has an elastic surface which forms a connection with the radial deformation through which a fluid can only flow to a low degree only under high pressure. Advantageously, the radial deformation can exert increased pressure on the elastic surface. In addition, the radial deformation forms a sealing edge which impedes the flow of the fluid between the sealing means and the surface of the inner jacket at the opening.

The opening of the jacket can have a section with a wedge-shaped cross section which is formed by the radial deformation of the jacket, wherein the opening tapers in the section toward the axial end of the jacket. This enables the sealing means to undergo compression due to the flowing fluid over virtually the entire axial length of the sealing means. Thus, the effect of extreme pressure fluctuations in the flowing fluid on the radial deformation connecting the jacket to the sealing means, in particular at the sealing edge, can be reduced. Thus, in operational situations with extreme pressure fluctuations, leakage of the fluid from the cooling jacket can be reduced.

The wedge-shaped cross section of a section of the opening formed by the radial deformation also causes the connection between the jacket and the sealing means to be self-reinforcing. The stronger the pressure exerted by the fluid flowing in the cooling jacket on the sealing means, the better the connection between the jacket and the sealing means is sealed against leakage of the fluid.

The opening can have an x-shaped cross section formed by the radial deformation of the jacket, wherein the opening tapers toward the axial end of the jacket as far as a narrow point and then widens again. The expanded region causes further sealing between the jacket and the sealing means with a lower exertion of force on the seal over a longer section. Thus, a wider section prevents unintentional leakage of the fluid from the cooling jacket.

The opening of the jacket can extend in the axial direction of the jacket. This enables an easy creation of the radial deformation of the jacket.

The jacket of the cooling jacket can advantageously comprise means that facilitate the creation of the radial deformation and/or enable this in a defined way.

The inner jacket of the jacket can have the radial deformation. This has the advantage that, on the establishment of the radial deformation on the inner jacket, the outer jacket can serve as a stop for a tool. The outer jacket can also be provided with sealing geometry in the opening which also reduces leakage of the fluid flowing in the cooling jackets. In addition, on the establishment of the radial deformation on the inner jacket, the outer jacket can serve as a stop for the positioning of the tool.

It is also advantageous that the sealing means is able to extend in a component which, together with the outer jacket of the cooling jacket, forms a housing. Thus, the radial deformation connecting the jacket to the sealing means is able to fix the sealing means such that mounting of a part of the housing, in particular to an end shield, at an axial end of the cooling jacket is facilitated.

The establishment of the radial deformation on the inner jacket enables the outer jacket to retain a defined length and thus to form a defined housing with the component.

The additional use of the sealing means as a seal for the housing or defined housing prevents the ingress of water into the housing so that degree of protection IP6K9K can be guaranteed. This IP degree of protection is, for example, described in the German Standard for road vehicles DIN 40050 Part 9.

In a further advantageous embodiment of a cooling jacket according to the invention, the opening is sealed in a direction toward the axial end in different planes. This enables the fluid flowing in the cooling jackets to be guided by the sealing means. Thus, it is advantageously possible to dispense with channels in the cooling jacket for deflecting the liquid at the axial end of the cooling jacket. Thus the channels in the cooling jacket can have a simple geometry. This results in simple production of the cooling jacket.

The different planes can extend perpendicularly to the axial direction in order to enable deflection over a short distance.

The sealing means can have a connection to divert the fluid from one channel to a second channel, wherein the sealing means separates the first and the second channel from a third channel. The separation of the third channel from the second channel takes place in that, in a region between the second and the third channel, the opening is sealed in a plane that is more remote from the axial end than in a region between the first and the second channel.

The sealing means can have a seal so that the sealing in different planes can be implemented by a seal that can be easily prefabricated. To this end, the seal can have a different length in the axial direction in different radial directions.

In a further advantageous embodiment of a cooling jacket according to the invention, the sealing means has the radial deformation. This has the advantage that a radial deformation according to the invention can be used without deformation of the jacket being necessary. The radial deformation of the sealing means creates a higher compression force in a first cross section of the sealing means than in a second cross section of the sealing means. This reduces unintentional leakage of the fluid flowing in the cooling jackets.

The compression force can reduce in a direction toward the axial end. Thus, sealing of the opening by means of a high compression force is achieved in the vicinity of a first end of the sealing means which is more remote from the axial end of the jacket and, in a further region of the sealing means toward a second end, which is closer to the axial end of the jacket, further sealing is achieved with a lower compression force and more extended sealing surfaces on the inner jacket and outer jacket.

The sealing means can have a recess at the first end so that the fluid flowing in the cooling jacket between the inner jacket and the outer jacket can flow more closely to the axial end of the jacket than in the vicinity of the surface of the inner jacket or the surface of the outer jacket. The recess advantageously enables a pressure of the fluid flowing in the cooling jackets for a self-reinforcing improvement of the connection between the radial deformation and the jacket. Thus, unintentional leakage of the fluid flowing in the cooling jackets from the cooling jacket is prevented.

The sealing means can comprise a solid part, which is a solid spring component, which has the radial deformation that is at least partially elastic. Thus, unintentional leakage of the fluid flowing in the cooling jackets from the cooling jacket can be reduced in different operational situations in that the fluctuating forces in the operational situations can be elastically counteracted by closing the opening.

BRIEF DESCRIPTION OF THE DRAWING

The above-described properties, features and advantages of this invention and the manner in which they are achieved will become clearer and more plainly comprehensible in conjunction with the description of the exemplary embodiments which are illustrated and explained in more detail in conjunction with the drawings, which show:

FIG. 1 a first exemplary embodiment of a cooling jacket,
FIG. 2 a cross section along the line II-II in FIG. 1,
FIG. 3 an exemplary embodiment of an electric machine,
FIG. 4 an exemplary embodiment of an axial end of the cooling jacket before the establishment of the radial deformation, FIGS. 5, 6 exemplary embodiments for a radial deformation on the cooling jacket, FIG. 7 an axial end of the cooling jacket before the establishment of a radial deformation, FIG. 8 a further exemplary embodiment of a radial deformation on the cooling jacket, FIGS. 9, 10 further exemplary embodiments of a radial deformation and a sealing means on a sealing jacket, FIGS. 11, 12 exemplary embodiments of a sealing means extending into a component, FIG. 13 a further exemplary embodiment of a sealing means, FIG. 14 a further exemplary embodiment of a jacket, FIG. 15 an enlarged portion of FIG. 14 in the environment of an axial end.

DETAILED DESCRIPTION OF PREFERRED EMBODIMENTS

Figure 10:
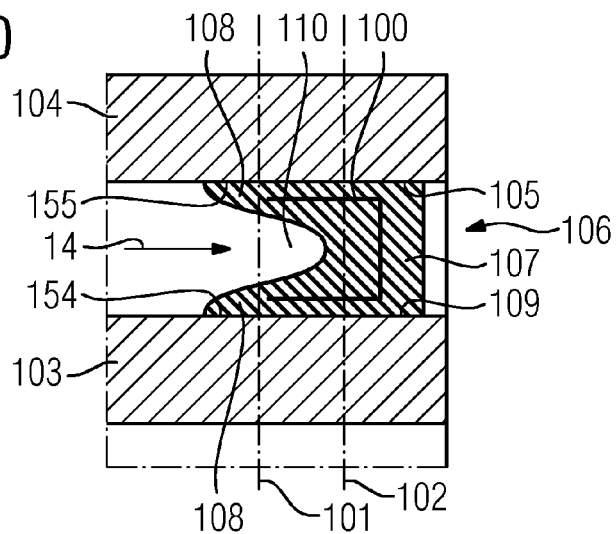

FIG. 1 shows an exemplary embodiment of a cooling jacket 1 comprising a jacket 2 and an inner jacket 3 and an outer jacket 4, wherein the jacket 2 has an opening 6 at an axial end 5. The cooling jacket further has a sealing means 7, arranged in the opening 6 and a radial deformation 8 connecting the jacket 2 to the sealing means 8, wherein the radial deformation 8 extends into the opening 6.

In FIG. 1, for orientation on the cooling jacket 1, the axial direction is indicated by a horizontal arrow 10 and the radial direction by a vertical arrow 9.

The cooling jacket 1 has a first connection 12 through which a fluid 14 flowing in the cooling jacket can enter the cooling jacket. The direction in which the fluid 14 is flowing is indicated by arrows 14 in FIG. 1.

The inner jacket 3 and the outer jacket 4 are formed from solid parts in the shape of a hollow cylinder. Aluminum extruded parts were used for the solid parts of the inner jacket 3 and the outer jacket 4, since the radial deformation 8 can be effectively established thereon and turning for sealing geometry on outer jacket 4 is possible.

FIG. 2 shows a cross section along the line II-II FIG. 1. FIG. 2 shows the second connection 13 for the outlet of the fluid 14 from the cooling jacket 1. The fluid 14 entering the cooling jacket 1 through the first connection 12 flows in the cooling jacket 1 in a meandering fashion through channels 11 of the cooling jacket 1 to the second connection 13 where it reemerges from the cooling jacket 1. The direction of flow of the fluid 14, which is a liquid, is represented by the arrows 14 in the channels 11, in the first connection 12 and in the second connection 13.

The opening 6 extends into the channels 11. Between the channels 11, the opening 6 at the axial end 5 of the jacket 2 is embodied as a groove bounded by the inner jacket 3 and the outer jacket 4.

FIG. 3 shows an exemplary embodiment of an electric machine 39 comprising a stator 35, a rotor 36 and a winding 351. A housing of the electric machine 39 has a cooling jacket 31 and end shields 34. The rotor 36 comprises a shaft 32 and is mounted rotatably in the end shields 34 by bearings 33. The cooling jacket 31 comprises the inner jacket 3 and the outer jacket 4 and a sealing means 37, which is arranged in the opening 6. The cooling jacket 31 also comprises a radial deformation 8, which connects the jacket 2 to the sealing means 37. The radial deformation 8 extends into the opening 6.

FIG. 4 shows an axial end 5 of a cooling jacket 1 before establishment of a radial deformation on the inner jacket 3 or the outer jacket 44. The outer jacket 44 has a sealing geometry 40, which extends into the opening 46. Thus, the sealing means 37 can be fixed before or during the establishment of a radial deformation. The sealing means 37 is a seal comprising a rubber. The opening 46 is an axial opening 46.

FIG. 5 shows an exemplary embodiment of the axial end 5 of the cooling jacket in FIG. 4 after the establishment of a radial deformation 58. The radial deformation 58 extends into the opening 56. Thus, the radial deformation 58 exerts an increased pressure via the surface 54 of the inner jacket 3 and the surface 55 of the outer jacket 44 onto an elastic surface of the sealing means 37. In addition, the radial deformation 58 forms a sealing edge 53 which obstructs the flow of the fluid 14 between the sealing means 37 and the surface 54 of the inner jacket 3 at the opening 56. By the exertion of increased pressure, the radial deformation 53 also causes the flow of the fluid 14 at the surface 55 of the outer jacket 44 to be obstructed to a high degree by the sealing geometry 40.

The radial deformation 58 can advantageously be created by pressing in a tool.

FIG. 6 shows a further exemplary embodiment of an axial end of a cooling jacket 1. In FIG. 6, the radial deformation 68 of the inner jacket 3 forms an opening 66, which has an x-shaped cross section.

FIG. 7 shows an axial end of a cooling jacket 1 before the establishment of a radial deformation. The outer jacket 74 has two sealing geometries 70.

FIG. 8 shows an axial end of a cooling jacket 1 after the establishment of a radial deformation 58. Thus, the opening 86 of the jacket 2—like the exemplary embodiment in FIG. 5—has a section with a wedge-shaped cross section, which is formed by the radial deformation 58 of the inner jacket 3. In FIG. 5, the opening 56 of the inner jacket 3 has a section with a wedge-shaped cross section, which is formed by the radial deformation 58 of the inner jacket 3. In FIG. 8, the sealing geometries 70 are formed by recesses in the surface 55 of the outer jacket 74. Due to fact that the radial deformation 58 exerts increased pressure on the elastic surfaces of the sealing means 37, the sealing means 37 is pressed into the sealing geometries 70 so that the flow of the fluid 14 between sealing means 37 and the surface 55 of the outer jacket 74 at the opening 86 is obstructed.

FIG. 9 shows an exemplary embodiment of an axial end of a cooling jacket 1 in which the sealing means 97 is a welded seam. The effect of the radial deformation 98 of the inner jacket 3 is that, before closing with a welded seam 97, the opening 96 has such a narrow width that a single welded seam is sufficient to close the opening 96 of the jacket 2. Thus, the radial deformation 98 connects the jacket 2 comprising the inner jacket 3 and the outer jacket 94 to the sealing means 97, which is a welded seam.

FIG. 10 shows a further exemplary embodiment of an axial end of a cooling jacket 1, wherein a sealing means 107 has a radial deformation 108. In a first cross section 101, the radial deformation 108 of the sealing means 107 creates a higher compression force than in a second cross section 102 of the sealing means 107. Thus, unintentional leakage of the fluid 14 flowing in the cooling jacket 1 is reduced. In order to reinforce the difference between the compression forces of the first and the second cross section, in addition to a rubber, the sealing means 107, comprises a solid spring component 100. The solid spring component 100 has a spring steel. In the exemplary embodiment in FIG. 10, the compression force is reduced in a direction toward the axial end. In the vicinity of a first end of the sealing means 107, which is more remote from the axial end of the jacket, a high compression force achieves a sealing of the opening 106. In a further region of the sealing means 107 toward a second end, which is closer to the axial end of the jacket, a further sealing can be achieved with a lower compression force and a more extended sealing surface 109 on the inner jacket 103 and a more extended sealing surface 105 on the outer jacket 104.

The sealing means 107 has a recess 110 at the first end so that the fluid 14 flowing in the cooling jacket 1 flows more closely to the axial end of the jacket 2 between the inner jacket 103 and the outer jacket 104 than in the vicinity of the surface 154 of the inner jacket 103 or the surface 155 of the outer jacket 104.

Figure 11:
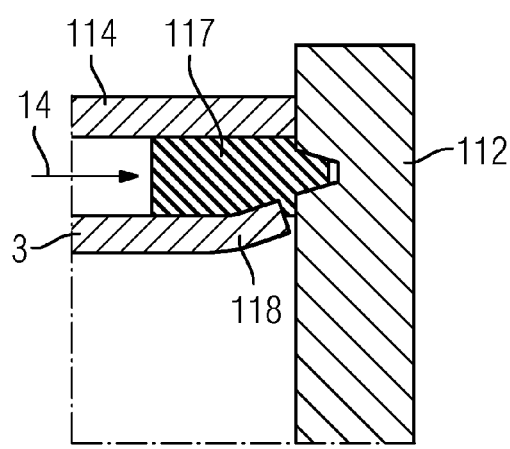

FIG. 11 shows an axial end the electric machine 39. The sealing means 117, which has a rubber, extends into a component, which is an end shield 112 and which, together with the outer jacket 114 of the cooling jacket 2, forms a housing. The inner jacket 3 has a radial deformation 118 which connects the sealing means 117 with the inner jacket 3 and the outer jacket 114 such that the leakage of the fluid 14 from the cooling jacket 1 is reduced independently of the presence of the end shield 112.

Figure 12:
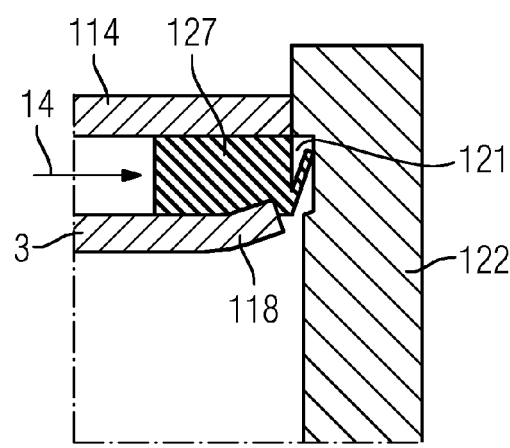

FIG. 12 shows a further exemplary embodiment of an axial end the electric machine 39. The sealing means 127 extends into the end shield 122, wherein, at a connecting point between the outer jacket 114 and the end shield 122, it has a collecting chamber 121. The collecting chamber 121 collects a liquid which unintentionally infiltrates the electric machine 39 from the environment of the electric machine 39 at the connecting point. The sealing means 127 also seals the connecting point in that it is pressed onto a surface of the end shield 122.

Figure 13:
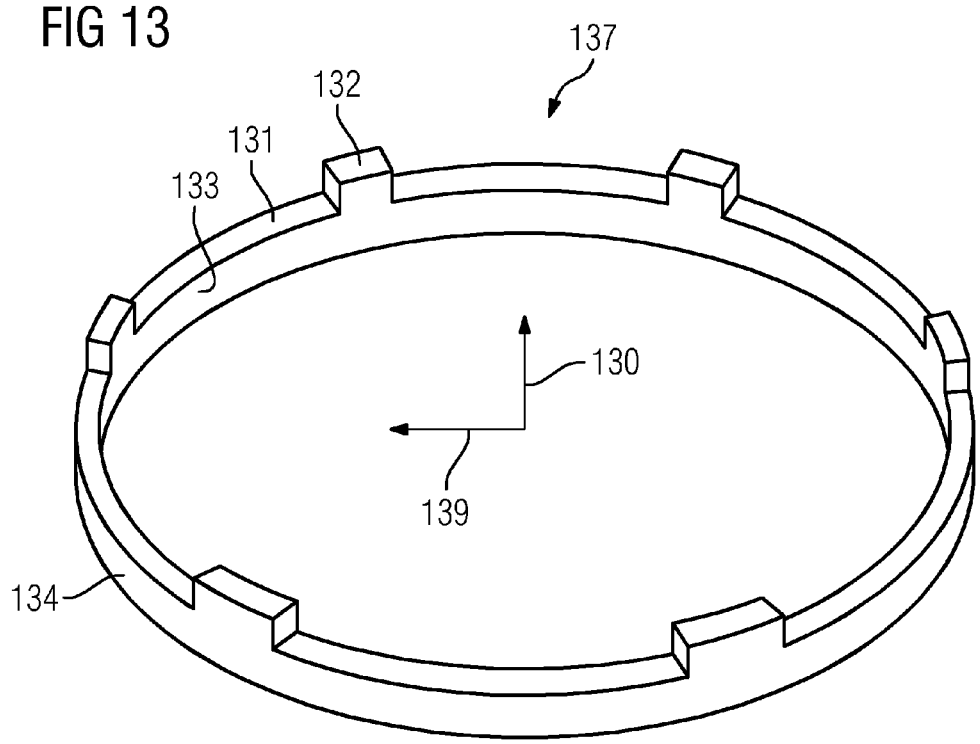

FIG. 13 shows an exemplary embodiment of a sealing means. The sealing means 137 has, in an axial direction 130, a simple continuous inner surface 133, which enables simple production of the sealing means 137. There is no need for any recesses or projections on the inner surface 133 of the sealing means 137 that are pronounced enough to enable the sealing means 137 to be mounted on the jacket 2 in a pressure resistant way. The sealing means 137 is held by means of a radial deformation according to the invention in the jacket 2.

The outer surface 134 of the sealing means 137 is also a simple continuous surface permitting a further simplification of the production of the sealing means 137.

In FIG. 13, a radial direction is depicted by the arrow 139.

The sealing means 137 has a first radial region 131 with a smaller length in the axial direction 130 and a second radial region 132 with greater length in the axial direction 130. Thus, the sealing means 137 has different lengths in the axial direction 130 in different radial directions. Thus, a jacket 2 of a cooling jacket 1 can be sealed at an opening 6 in a direction toward the axial end 5 in different planes while using the sealing means 137.

When the sealing means 137 are used, the different planes extend perpendicularly to the axial direction 130. Thus, the first and the second radial regions 131 and 132 of the sealing means 137 are formed by simple continuous surfaces.

In the exemplary embodiment of the sealing means 137 according to FIG. 13, the sealing means 137 is a seal produced from a rubber.

Figure 14:
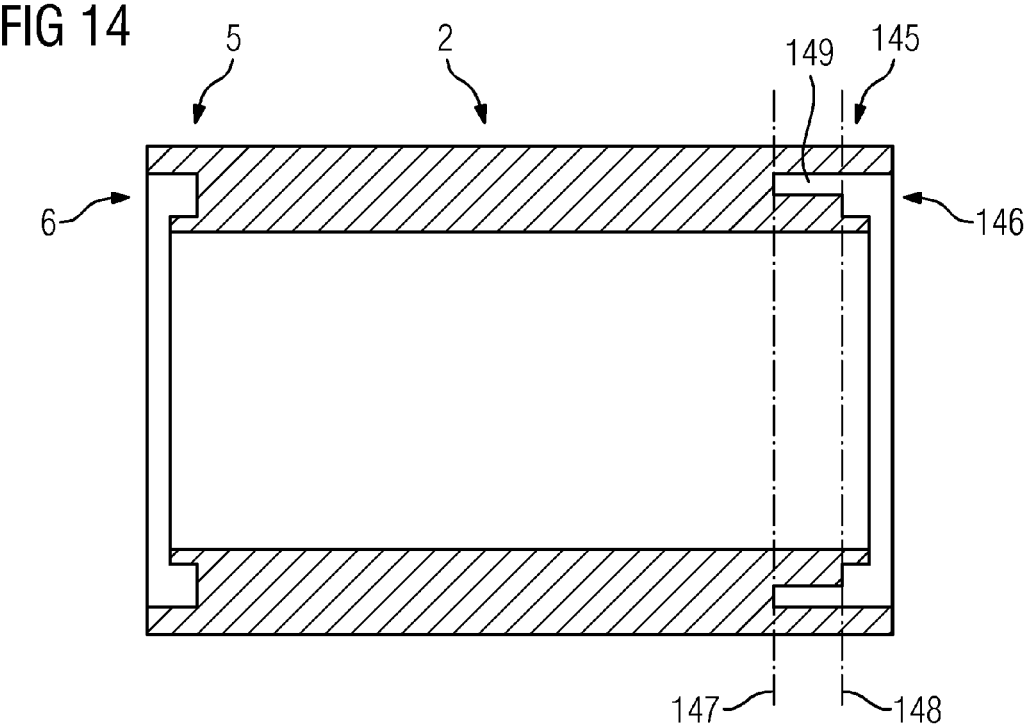

FIG. 14 shows an exemplary embodiment of a jacket 2. It has an opening 146. This has a deflection opening 149. An arrangement of the sealing means 137 in the opening 146 of the jacket 2 causes the deflection opening 149 to be partially closed by the second radial region 132 of the sealing means 137. Thus, a diversion of the fluid from one channel 11 to a second channel 11 is achieved, wherein the sealing means 137 separates the first and the second channel 11 from a third channel 11 by the second radial region 132 of the sealing means 137. By means of a first plane 147 of the jacket 2 and a second plane 148, the jacket 2 has different planes to seal the cooling jacket 1.

Figure 15:
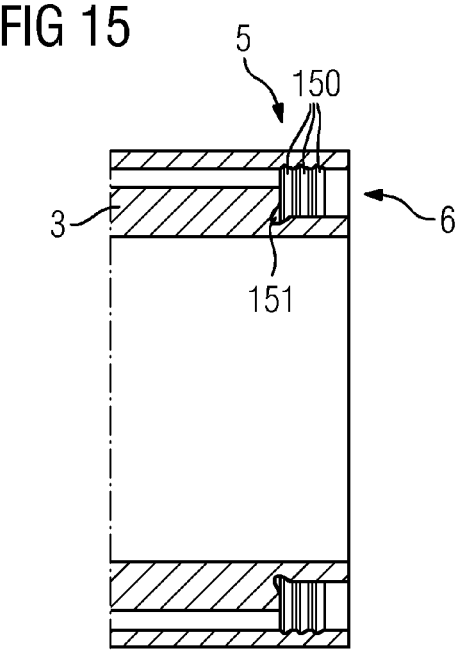

FIG. 15 shows an exemplary embodiment of an axial end 5 of a jacket 2. The axial end 5 has sealing geometries 150 in the opening 6. In order to achieve an establishment of a radial deformation at the axial end 5 in a simple manner, the jacket 2 advantageously has means at the axial end 5, which simplify the creation of a radial deformation and/or enable this in a defined manner. The means is a recess 151, which is applied in the opening 6 on the inner jacket 3.

Although the invention was described in more detail by the preferred exemplary embodiments, it is not restricted to the disclosed examples. Other variants can be derived herefrom the person skilled in the art without departing from the scope of protection of the invention.

The invention claimed is:

1. A cooling jacket, comprising:
   a jacket having an axial end provided with an opening, said jacket including an inner jacket part and an outer jacket part in spaced-apart surrounding relationship to the inner jacket part to define a passageway for a fluid, said cooling jacket being an independent component of a machine without having a bearing shielding to exhibit sealing; and
   a sealing structure arranged in the opening, said sealing structure being welded on the cooling jacket,
   wherein a member selected from the group consisting of the jacket and the sealing structure has a radial deformation forming a section of the opening with a wedge-shaped cross-section to connect the jacket to the sealing structure, said radial deformation being configured to extend into the opening.

2. The cooling jacket of claim 1, wherein the member is the jacket.

3. The cooling jacket of claim 1, wherein the sealing structure has a seal.

4. The cooling jacket of claim 1, wherein the sealing structure is configured to seal the opening in a direction toward the axial end in different planes.

5. The cooling jacket of claim 1, wherein the member is the sealing structure.

6. A machine, comprising a cooling jacket being an independent component of the machine without having a bearing shielding to exhibit sealing, said cooling jacket including a jacket, said jacket including an inner jacket part and an outer jacket part in spaced-apart surrounding relationship to the inner jacket part to define a passageway for a fluid and having an axial end provided with an opening, and a sealing structure arranged in the opening, said sealing structure being welded on the cooling jacket, wherein a member selected from the group consisting of the jacket and the sealing structure has a radial deformation forming a section of the opening with a wedge-shaped cross-section to connect the jacket to the sealing structure, said radial deformation being configured to extend into the opening.

7. An electric machine, comprising:
   a stator having a winding;
   a rotor interacting with the stator and having a shaft rotatably mounted in end shields; and
   a cooling jacket in surrounding relationship to the stator, said cooling jacket being an independent component of the electrical machine without having a bearing shielding to exhibit sealing, said cooling jacket including a jacket, said jacket including an inner jacket part and an outer jacket part in spaced-apart surrounding relationship to the inner jacket part to define a passageway for a fluid and having an axial end provided with an opening, and a sealing structure arranged in the opening, said sealing structure being welded on the cooling jacket, wherein a member selected from the group consisting of the jacket and the sealing structure has a radial deformation forming a section of the opening with a wedge-shaped cross-section to connect the jacket to the sealing structure, said radial deformation being configured to extend into the opening.

8. A method for producing a cooling jacket, comprising:

forming a jacket, said jacket including an inner jacket part and an outer jacket part in spaced-apart surrounding relationship to the inner jacket part to define a passageway for a fluid, by disposing the outer jacket part in surrounding relationship to the inner jacket part such as to form an opening at an axial end of the jacket;

placing a sealing structure in the opening, said sealing structure being welded on the cooling jacket, said cooling jacket being an independent component of a machine without having a bearing shielding to exhibit sealing; and deforming a member selected from the group consisting of the jacket and the sealing structure such as to produce a radial deformation forming a section of the opening with a wedge-shaped cross-section sized to extend into the opening and thereby connect the jacket to the sealing structure.

9. A method for producing a machine, comprising:

forming a cooling jacket being an independent component of the machine without having a bearing shielding to exhibit sealing, said cooling jacket including a jacket including an inner jacket part and an outer jacket part in spaced-apart surrounding relationship to the inner jacket part to define a passageway for a fluid, by disposing the outer jacket part in surrounding relationship to the inner jacket part such as to form at an axial end of the jacket an opening in communication with a channel between the inner and outer jacket parts for a flow of the fluid between a first connection through which the fluid enters the channel of the cooling jacket and a second connection through which the fluid exits the cooling jacket;

placing a sealing structure in the opening, said sealing structure being welded on the cooling jacket;

deforming a member selected from the group consisting of the jacket and the sealing structure such as to produce a radial deformation forming a section of the opening with a wedge-shaped cross-section such as to extend into the opening and thereby connect the jacket to the sealing structure; and testing a tightness of the cooling jacket before mounting an end shield on the cooling jacket.

10. The method of claim 9, wherein the machine is an electric machine.

* * * * *